(12) United States Patent
Maldonado et al.

(10) Patent No.: US 9,206,744 B2
(45) Date of Patent: Dec. 8, 2015

(54) SYSTEM AND METHOD FOR OPERATING A GAS TURBINE ENGINE

(75) Inventors: Jaime Javier Maldonado, Simpsonville, SC (US); Sandip Dutta, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 722 days.

(21) Appl. No.: 13/607,619

(22) Filed: Sep. 7, 2012

(65) Prior Publication Data

US 2014/0072399 A1 Mar. 13, 2014

(51) Int. Cl.
| | | |
|---|---|---|
| F01D 5/08 | (2006.01) |
| F02C 7/26 | (2006.01) |
| F01D 25/10 | (2006.01) |
| F02C 9/18 | (2006.01) |
| F02C 7/12 | (2006.01) |

(52) U.S. Cl.
CPC . *F02C 7/26* (2013.01); *F01D 25/10* (2013.01); *F02C 7/12* (2013.01); *F02C 9/18* (2013.01); F05D 2270/305 (2013.01); Y02T 50/675 (2013.01)

(58) Field of Classification Search
CPC ............. F02C 7/12; F02C 7/26; F02C 9/18; F01D 25/10; F05D 2260/85
See application file for complete search history.

(56) References Cited

U.S. PATENT DOCUMENTS

| | | | |
|---|---|---|---|
| 4,257,222 A | 3/1981 | Schwarz | |
| 4,893,983 A * | 1/1990 | McGreehan | .................... 415/48 |
| 5,228,828 A | 7/1993 | Damlis et al. | |
| 7,481,621 B2 | 1/2009 | Campbell et al. | |
| 7,575,409 B2 | 8/2009 | Dierksmeier et al. | |
| 8,973,373 B2 * | 3/2015 | Arar | ................................ 60/785 |
| 2013/0323016 A1 * | 12/2013 | Javelot et al. | ..................... 415/1 |

FOREIGN PATENT DOCUMENTS

| | | |
|---|---|---|
| EP | 0381895 A1 | 8/1990 |
| EP | 0578285 A1 | 1/1994 |
| EP | 1923539 A2 | 5/2008 |
| JP | 62085700 | 4/1987 |

* cited by examiner

*Primary Examiner* — Dwayne J White
*Assistant Examiner* — Jason Fountain
(74) *Attorney, Agent, or Firm* — Fletcher Yoder, P.C.

(57) ABSTRACT

A system includes a gas turbine engine, which includes a compressor configured to generate compressed air and a turbine. The turbine includes a stationary component and a conduit configured to convey the compressed air from the compressor to the stationary component in a forward direction. The gas turbine engine also includes a flow control device coupled to the conduit. The conduit is configured to convey a gas path air from the stationary component in a reverse direction opposite from the forward direction when the flow control device is in a startup mode. The gas turbine engine also includes a shaft coupled to the compressor and the turbine.

20 Claims, 3 Drawing Sheets

SYSTEM AND METHOD FOR OPERATING A GAS TURBINE ENGINE

BACKGROUND OF THE INVENTION

The subject matter disclosed herein relates to gas turbine engines, and particularly, to operating a gas turbine engine.

In general, gas turbine engines combust a mixture of compressed air and fuel to produce hot combustion gases. The combustion gases may flow through one or more turbine stages to generate power for a load and/or compressor. Each turbine stage includes a plurality of turbine blades, which are driven to rotate by the combustion gases. Temperatures of different components of the gas turbine engine may change at different rates during transitions in the operation of the gas turbine engine, such as startups, shutdowns, and other changes in load rates. For example, certain components of the gas turbine engine may reach the desired operating temperature before other components, thereby creating potential interference (e.g., a rub condition) issues between the components. These interference issues may be partially addressed by increasing the time associated with the transition (i.e., decreasing the rate of the transition). Unfortunately, such measures may decrease the operating efficiency of the gas turbine engine and/or delay the operation of the engine at its full capacity.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gas turbine engine, which includes a compressor configured to generate compressed air and a turbine. The turbine includes a stationary component and a conduit configured to convey the compressed air from the compressor to the stationary component in a forward direction. The gas turbine engine also includes a flow control device coupled to the conduit. The conduit is configured to convey a gas path air from the stationary component in a reverse direction opposite from the forward direction when the flow control device is in a startup mode. The gas turbine engine also includes a shaft coupled to the compressor and the turbine.

In a second embodiment, a system includes a control system having instructions to transmit a first output signal to a flow control device to flow compressed air from a compressor of a gas turbine engine to a stationary component of a turbine of the gas turbine engine through a conduit in a forward direction. The control system is also has instructions to transmit a second output signal to the flow control device to flow a gas path air from the stationary component through the conduit in a reverse direction opposite from the forward direction.

In a third embodiment, a method includes flowing a gas path air from a stationary component of a turbine of a gas turbine engine through a conduit in a reverse direction when a flow control device is in a startup position and heating a casing of the turbine using the flow of the gas path air through the conduit when the flow control device is in the startup position.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
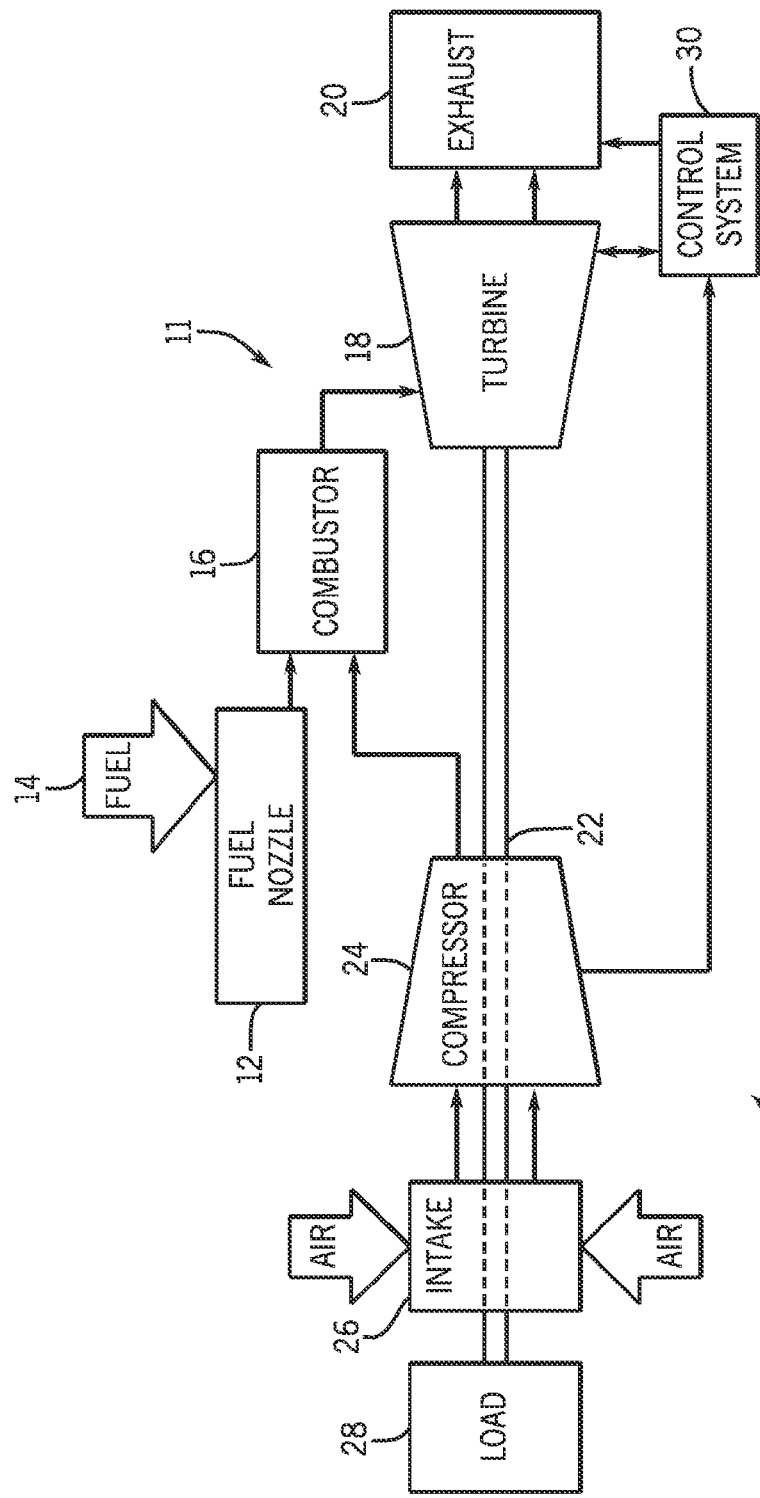
FIG. 1 is a block diagram of an embodiment of a turbine system having a control system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, certain embodiments provide systems and methods for operating gas turbine engines. The disclosed embodiments may improve the operating efficiency, such as the startup performance, of the gas turbine engine. For example, a gas turbine engine may include a compressor that generates compressed air, a combustor that combusts a mixture of the air and fuel to generate products of combustion, and a turbine driven by the products of combustion. The products of combustion may also be referred to as gas path air, hot gas path air, exhaust gas, hot exhaust gas, combustion gas, hot combustion gas, and so forth. The products of combustion are generally hotter than the compressed air from the compressor. The turbine may include a stationary component and a conduit that conveys the compressed air from the compressor to the stationary component (e.g., for cooling and/or clearance control) in a forward direction. Examples of stationary components in the turbine include nozzles, stationary blades, and shrouds. The gas turbine engine may also include a flow control device (e.g., a valve) coupled to the conduit. The conduit may convey a gas path air (e.g., the products of combustion) from the stationary component in a reverse direction opposite from the forward direction when the flow control device is in a startup mode. Examples of flow control devices include three-way valves and two-way valves.

During the startup of the gas turbine engine (e.g., when the gas turbine engine operates at a startup speed that is less than a normal speed), the temperature of the gas path air may be greater than the temperature of the compressed air. Specifically, the combustion of the fuel may increase the temperature of the gas path air and exposure of the gas path air to components of the gas turbine engine that are hot (i.e., at a temperature greater than an ambient temperature) may also increase the temperature. For example, the gas turbine engine may have been operating before being shutdown and certain components may still be hot. By conveying the hotter gas path air through the conduit of the turbine during startup in the disclosed embodiments, components of the turbine coupled to the conduit may be heated by the gas path air. Thus, temperature differentials within the turbine during startup may be reduced, thereby reducing interference issues (e.g., possible rub condition) between moving and stationary components of the turbine, for example. In other gas turbine engines, such interference issues may increase the startup time of the gas turbine engine. In other words, the rate of startup may be decreased to reduce the temperature differential. Thus, by conveying the gas path air through the conduit in the reverse direction as described in the disclosed embodiments, the startup time of the gas turbine engine may be reduced, thereby increasing the operating efficiency of the gas turbine engine. In certain embodiments, a control system may transmit an output signal to the flow control device to flow the gas path air in the reverse direction through the conduit during startup of the gas turbine engine.

Turning now to the drawings and referring first to FIG. 1, a block diagram of an embodiment of a turbine system 10 having a gas turbine engine 11 is illustrated. The turbine system 10 may use liquid or gaseous fuel, such as natural gas and/or a synthetic gas, to drive the turbine system 10. As depicted, one or more fuel nozzles 12 intake a fuel supply 14. The fuel nozzles 12 then mix the fuel with air, and distribute the fuel and air mixture into a plurality of combustors 16, which may be arranged circumferentially about the gas turbine engine 11, where further mixing occurs between the fuel and air. Although shown schematically as being outside or separate from the combustors 16, the fuel nozzles 12 may be disposed inside the combustors 16. The fuel and air mixture combusts in a chamber within the combustors 16, thereby creating hot pressurized exhaust gases. The combustors 16 direct the exhaust gases through a turbine 18 toward an exhaust outlet 20. Each of the plurality of combustors 16 may include separate fuel nozzles 12. As the exhaust gases pass through the turbine 18, the gases force turbine blades to rotate a shaft 22 along an axis of the turbine system 10. As illustrated, the shaft 22 is connected to various components of the turbine system 10, including a compressor 24. The compressor 24 also includes blades coupled to the shaft 22. As the shaft 22 rotates, the blades within the compressor 24 also rotate, thereby compressing air from an air intake 26 through the compressor 24 and into the fuel nozzles 12 and/or combustors 16. The shaft 22 may also be connected to a load 28, which may be a vehicle or a stationary load, such as an electrical generator in a power plant or a propeller on an aircraft, for example. The load 28 may include any suitable device capable of being powered by the rotational output of turbine system 10. A control system 30 may be used to route various flows of gases through the turbine system 10 to increase the operating efficiency of the turbine system 10. For example, the control system 30 may be used to route compressed air from the compressor 24 to the turbine 18 and/or a gas path air from the turbine 18 to the exhaust outlet 20 during startup, as described in detail below.

Figure 2:
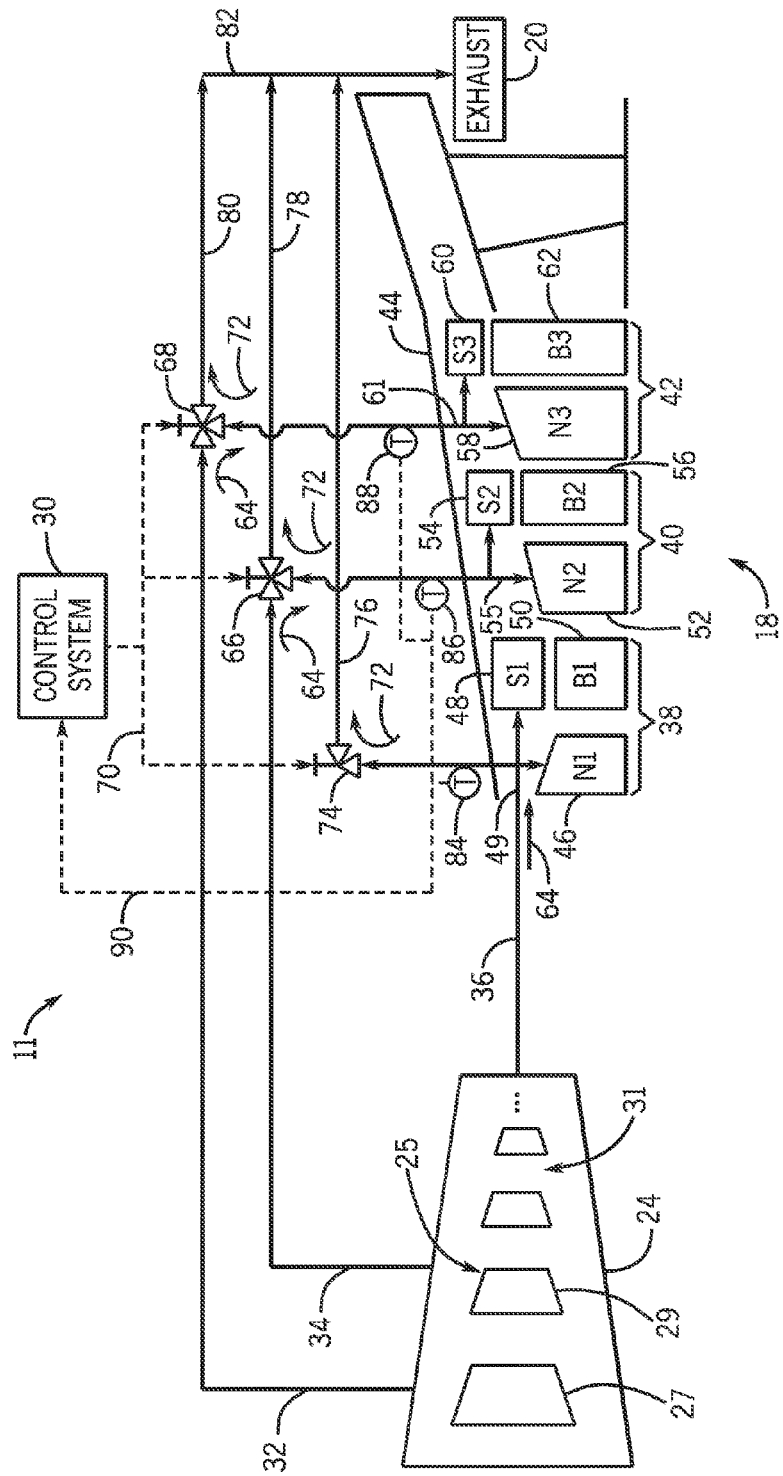
FIG. 2 is a block diagram of an embodiment of a turbine system having a conduit for conveying a gas path air.

FIG. 2 illustrates a block diagram of the gas turbine engine 11 of FIG. 1 in further detail. The compressor 24 shown in FIG. 2 may be a multistage compressor. Thus, compressed air from one or more stages 25 of the multistage compressor 24 may be conveyed to the turbine 18. For example, a first stage compressed air conduit 32 may convey compressed air from a first stage 27 of the compressor 24 to the turbine 18 and a second stage compressed air conduit 34 may convey compressed air from a second stage 29 of the compressor 24 to the turbine 18. In addition, a compressor discharge conduit 36 may convey compressed air from the discharge of the compressor 24 to the turbine 18. In other embodiments, additional compressed air conduits may convey compressed air from additional stages 31 of the compressor 24 to the turbine 18. During operation of the gas turbine engine 11, the compressed air from the compressor 24 may be used to cool certain components of the turbine 18. Specifically, the compressed air from the compressor 24 may be used to cool stationary components of the turbine 18, as discussed in detail below. For example, the turbine 18 may be a multistage turbine with a first stage 38, a second stage 40, and a third stage 42. In other embodiments, the turbine 18 may include additional stages. Each of these stages 38, 40, and 42 may be disposed within a casing 44 that serves to enclose the various components of the turbine 18. In other words, the casing 44 may act as a barrier between the high temperatures within the turbine 18 and the external environment.

As shown in FIG. 2, the first stage 38 may receive the compressed air from the compressor discharge conduit 36, the second stage 40 may receive compressed air from the second stage compressed air conduit 34, and the third stage 42 may receive compressed air from the first stage compressed air conduit 32. In other embodiments, the arrangement of the compressed air conduits between the compressor 24 and the turbine 18 may be different. Each of the stages 38, 40, and 42 may include several components, which may be stationary or rotatable. For example, the first stage 38 may include one or more first stage nozzles 46, a first stage shroud 48, and one or more first stage buckets (i.e., blades) 50. The one or more first stage nozzles 46 may be used to direct hot pressurized combustion gases (i.e., gas path air) into the first stage 38. The first stage shroud 48 may surround the one or more first stage buckets 50 (e.g., 1 to 500 blades), which may rotate in response to the flow of the exhaust gases (i.e., gas path air) through the turbine 18. Thus, the first stage nozzles 46 and the first stage shroud 48 are stationary components and the first stage buckets 50 are rotatable components. Similarly, the second stage 40 may include one or more second stage nozzles 52, a second stage shroud 54, and one or more second stage buckets 56. The third stage 42 may also include one or more third stage nozzles 58, a third stage shroud 60, and one or more third stage buckets 62.

As shown in FIG. 2, a first stage conduit 49 may be coupled to the compressor discharge conduit 36 and used to convey the compressed air from the compressor discharge conduit 36 to the first stage nozzles 46 and the first stage shroud 48. Thus, the first stage conduit 49 may correspond to that portion of the overall conduit, or path, of the compressed air from the compressor 24 that is disposed inside the casing 44. A second stage conduit 55 may be coupled to the second stage compressed air conduit 34 and used to convey the compressed air to the second stage nozzles 52 and the second stage shroud 54. Similarly, a third stage conduit 61 may be coupled to the first stage compressed air conduit 32 and used to convey the compressed air to the third stage nozzles 58 and the third stage shroud 60. Again, the second and third stage conduits 55 and 61 may be disposed inside the casing 44. As illustrated in FIG. 2, the compressed air from the compressor 24 may flow to the stages 38, 40, and 42 of the turbine 18 in the forward direction indicated by arrows 64 during normal operation of the gas turbine engine 11. As discussed above, the compressed air from the compressor 24 may be used to cool stationary components of the turbine 18, such as the nozzles 46, 52, and 58, and the shrouds 48, 54, and 60.

In certain embodiments, one or more flow control devices (e.g., valves) may be used to control the flow of the compressed air from the compressor 24 to the turbine 18. For example, a second stage flow control device 66 may be disposed between the compressor 24 and the turbine 18 and coupled to the second stage compressed air conduit 34. Similarly, a third stage flow control device 68 may be disposed between the compressor 24 and the turbine 18 and coupled to the first stage compressed air conduit 32. In certain embodiments, the second and third stage flow control devices 66 and 68 may be three-way valves, as shown in FIG. 2. In other embodiments, a plurality of two-way valves (e.g., 2, 3, or more valves) may be used instead of one three-way valve for each of the second and third stage flow control devices 66 and 68. In further embodiments, other devices may be used to control the flow of the compressed air from the compressor 24 to the turbine 18.

As mentioned above, the control system 30 may be used to control various aspects of the turbine system 10. In certain embodiments, the control system 30 may execute computer-implemented processes and include apparatuses for practicing those processes. In some embodiments, the control system 30 may include a computer program product having computer program code containing instructions embodied in non-transitory tangible media, such as floppy diskettes, CD-ROMs, hard drives, USB (universal serial bus) drives, or any other computer-readable or machine-readable storage medium, wherein, when the computer program code is loaded into and executed by a computer, the computer becomes an apparatus for practicing certain embodiments. In further embodiments, the control system 30 may include computer program code, for example, whether stored in a storage medium (e.g., memory), loaded into and/or executed by a computer, or transmitted over some transmission medium, such as over electrical wiring or cabling, through fiber optics, or via wireless transmission, wherein when the computer program code is loaded into and executed by a computer, the computer becomes an apparatus for practicing certain embodiments. When implemented on a general-purpose processor, the computer program code segments configure the processor to create specific logic circuits. Specifically, the control system 30 may include computer code disposed on a computer-readable storage medium or be a process controller that includes such a computer-readable storage medium. The computer code may include instructions to flow the gas path air from stationary components of the turbine 18 to the exhaust outlet 20, as described in detail below.

Returning to FIG. 2, the second and third stage flow control devices 66 and 68 may receive one or more output signals 70 from the control system 30. The control system 30 may use the output signals 70 to change the positions or modes of the second and third stage flow control devices 66 and 68 during startup of the gas turbine engine 11. Specifically, the control system 30 may include instructions to direct the second and third stage flow control devices 66 and 68 to enable the gas path air from the turbine 18 to flow in a reverse direction indicated by arrow 72. This may be referred to as a startup mode, startup position, or cold startup position. Specifically, the hot gas path air may flow through the second and third stage conduits 55 and 61 toward the second and third stage flow control devices 66 and 68 in the reverse direction (arrows 72) opposite that of the flow of compressed air in the forward direction (arrows 64). When the gas path air is flowing through the second and third stage flow control devices 66 and 68 in the reverse direction indicated by the arrows 72, little to no compressed air from the compressor 24 is flowing to the second and third stages 40 and 42 of the turbine 18.

During startup of the gas turbine engine 11, the temperature of the gas path air may be greater than that of the compressed air (e.g., because of a recent shutdown). For example, the gas path air may be in contact with hot components of the gas turbine engine 11. Thus, the flow of the gas path air through the second and third stage conduits 55 and 61 may help to heat components of the turbine 18 coupled to or adjacent the second and third stage conduits 55 and 61. For example, the flow of the gas path air through the second and third stage conduits 55 and 61 may help to heat the casing 44, which may not otherwise be in contact with the gas path air. Thus, additional components of the turbine 18 may be exposed to the hot gas path air than when the second and third stage flow control devices 66 and 68 are not used to enable the gas path air to flow in the reverse direction indicated by the arrows 72. By heating additional components of the turbine 18, interference issues (e.g., possible rub condition) between the components of the turbine 18 (e.g., between rotating and stationary components) may be reduced, thereby enabling the turbine 18 to be started up in less time. For example, the clearance between the rotating first, second, and third stage buckets 50, 56, and 62 and the stationary first, second, and third stage nozzles 46, 52, and 58 and/or stationary first, second, and third stage shrouds 48, 54, and 60 and may be maintained above a minimum clearance threshold.

A first stage flow control device 74 may also be used to enable gas path air to flow from the first stage 38 in the reverse direction indicated by the arrow 72. In certain embodiments, the first stage flow control device 74 may be a two-way valve. During normal operation of the turbine 18, the first stage flow control device 74 may be in a closed position to help block flow of the compressed air from the compressor discharge conduit 36 in the reverse direction indicated by the arrow 72. During startup of the turbine 18, the first stage flow control device 74 may be in an open position to enable the gas path air from the first stage 38 to flow through the first stage conduit 49 in the reverse direction indicated by the arrow 72. Specifically, the gas path air from the first stage 38 may flow through the first stage flow control device 74 into a first stage exhaust conduit 76 coupled to the exhaust outlet 20. Similarly, a second stage exhaust conduit 78 may be coupled to the second stage flow control device 66 to enable the gas path air flow in the reverse direction indicated by the arrow 72 to the exhaust outlet 20. A third stage exhaust conduit 80 may also be used to enable the gas path air from the third stage 42 to flow through the third stage flow control device 68 in the reverse direction indicated by the arrow 72 to the exhaust outlet 20. In certain embodiments, a common exhaust conduit 82 may be coupled to the first, second, and third stage exhaust conduits 76, 78, and 80 to enable the gas path air to flow to the exhaust outlet 20.

In certain embodiments, one or more sensors may be disposed throughout the gas turbine engine 11 and used to provide input to the control system 30. Specifically, a first stage temperature sensor 84 may be coupled to the first stage conduit 49, a second stage temperature sensor 86 may be coupled to the second stage conduit 55, and a third stage temperature sensor 88 may be coupled to the third stage conduit 61. The temperature sensors 84, 86, and 88 may provide one or more input signals 90 to the control system 30. The input signals 90 may be used by the control system 30 to execute instructions to determine when to switch operation of the flow control devices 66, 68, and 74 from heating components of the turbine 18 during start up and cooling stationary components of the turbine 18 during normal operation. For example, certain components of the turbine 18 may have high operating temperature thresholds. Thus, the control system 30 may execute instructions to use feedback from the sensors 84, 86, and 88 to stop the flow of the gas path air through the conduits 49, 55, and 61 when the temperature indicated by one or more of the sensors 84, 86, and 88 approaches the high temperature threshold. In other embodiments, other methods may be used to switch the flow control devices 66, 68, and 74 from heating to cooling the turbine 18. For example, based on previous operating experience, a time duration for heating the stationary components of the turbine 18 may be determined. Thus, when the control system 30 determines that the duration of sending the output signal 70 to the flow control devices 66, 68, and 74 to flow the gas path air in the reverse direction of the arrow 72 exceeds the threshold duration, the control system 30 may execute instructions to send output signals 70 to the flow control devices 66, 68, and 74 to flow compressed air in the forward direction indicated by the arrows 64. In further embodiments, the gas turbine engine 11 may include additional sensors and/or sensors disposed in locations different from those shown in FIG. 2. For example, the control system 30 may receive signals indicative of temperatures of one or more stationary components, such as the nozzles 46, 52, and 58 and/or the shrouds 48, 54, and 60, and use those signals to switch between the forward and reverse directions.

Figure 3:
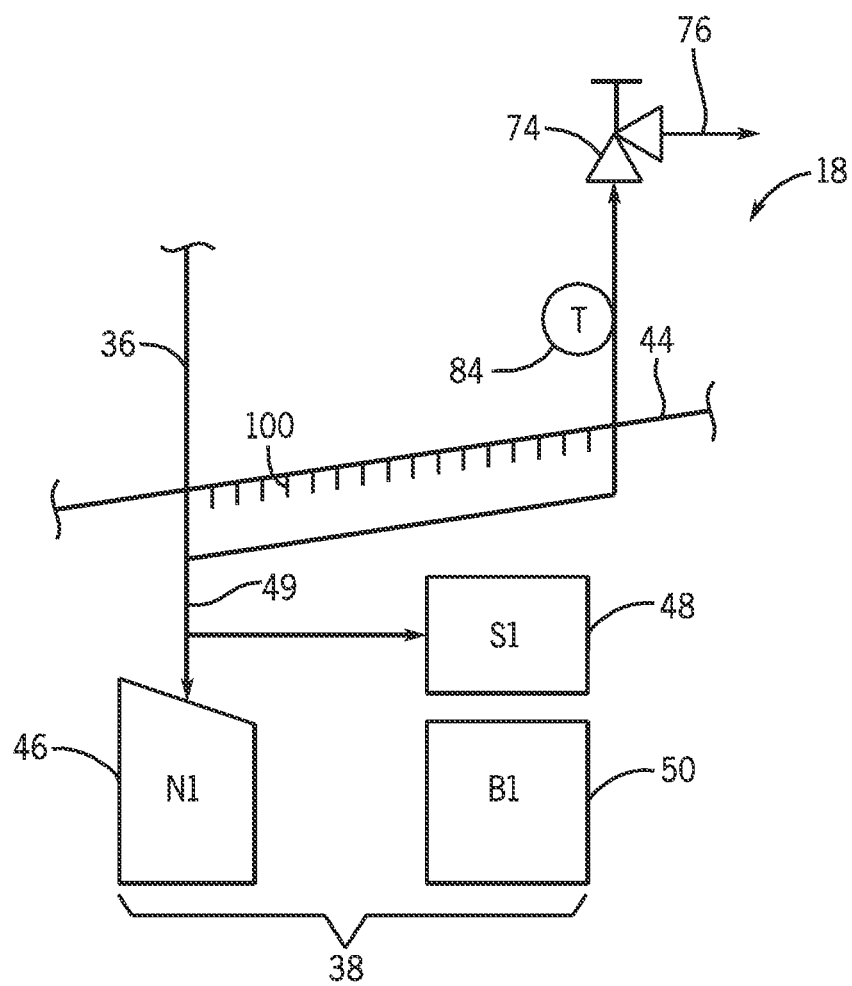
FIG. 3 is a block diagram of an embodiment of a turbine stage having heat transfer enhancement elements.

FIG. 3 is a block diagram of a portion of the turbine 18. Specifically, FIG. 3 shows the first stage 38 of the turbine 18. As shown in FIG. 3, the first stage conduit 49 is used to route the gas path air from the first stage nozzles 46 and the first stage shroud 48 to the first stage flow control device 74. Further, a portion of the first stage conduit 49 may be routed adjacent the casing 44 to help heat the casing 44 and any other adjacent components of the turbine 18 using the gas path air. In certain embodiments, one or more heat transfer enhancement elements 100 may be disposed on an inner surface of the casing 44. For example, the heat transfer enhancement elements 100 may be fins, turbulators, impingement plates, or any combination thereof. The heat transfer enhancement elements 100 may improve the heat transfer from the gas path air flowing through the first stage conduit 49 to the casing 44. In further embodiments, the heat transfer enhancement elements 100 may be used in the other stages of the turbine 18 wherever improved heat transfer is desired.

Technical effects of the invention include improving the operating efficiency of the gas turbine engine 11, specifically reducing the duration associated with startup of the gas turbine engine. In certain embodiments, one or more flow control devices 66, 68, and 74 may be used to enable gas path air to flow from one or more conduits 49, 55, and 61 coupled to stationary components of the turbine 18 to the exhaust outlet 20. Examples of the stationary components of the turbine 18 include the first, second, and third stage nozzles 46, 52, and 58, and the first, second, and third stage shrouds 48, 54, and 60. During normal operation of the gas turbine engine 11, the flow control devices 66, 68, and 74 may be used to enable compressed from the compressor 24 to cool the stationary components of the turbine 18. By enabling the gas path air to flow through the conduits 49, 55, and 61 during startup of the gas turbine engine 18, certain components of the gas turbine engine 18 may be heated, thereby reducing temperature differences throughout the gas turbine engine 18. By reducing the temperature differences in the gas turbine engine 18, interference issues may be reduced and the gas turbine engine 18 may be started over a shorter duration. For example, in certain embodiments, a start-up time (i.e., amount of time to reach thermal stability) of the gas turbine engine 11 may be reduced to less than approximately 50, 40, 30, 20, or 10 percent of a nominal start-up time (i.e., start-up time associated with gas turbine engines that do not include the disclosed embodiments) with less interference and degradation of components (i.e., rubbing). Thus, the operating efficiency of the gas turbine engine 11 may be improved.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a gas turbine engine, comprising:
      a compressor configured to generate compressed air;
      a turbine, comprising:
         a stationary component; and
         a conduit configured to convey the compressed air from the compressor to the stationary component in a forward direction;
      a flow control device coupled to the conduit, wherein the conduit is configured to convey a gas path air from the stationary component in a reverse direction opposite from the forward direction when the flow control device is in a startup mode; and
      a shaft coupled to the compressor and the turbine.

2. The system of claim 1, wherein the conduit is configured to convey the gas path air to an exhaust outlet of the turbine when the flow control device is in the startup mode.

3. The system of claim 1, wherein the flow control device comprises at least one of a three-way valve, or a plurality of two-way valves, or a combination thereof.

4. The system of claim 1, comprising a heat transfer enhancement element disposed in a casing of the turbine, wherein the heat transfer enhancement element is configured to improve heat transfer from the gas path air to the casing when the flow control device is in the startup mode.

5. The system of claim 4, wherein the heat transfer enhancement element comprises at least one of a fin, a turbulator, or an impingement plate, or a combination thereof.

6. The system of claim 1, wherein the stationary component comprises at least one of a nozzle, a shroud, a stationary blade, or a stationary bucket, or a combination thereof.

7. The system of claim 1, comprising a plurality of turbine stages, wherein the conduit is configured to convey the gas path air from each of the plurality of turbine stages in the reverse direction when the flow control device is in the startup mode.

8. A system, comprising:
   a control system having instructions to transmit a first output signal to a flow control device to flow compressed air from a compressor of a gas turbine engine to a stationary component of a turbine of the gas turbine engine through a conduit in a forward direction, and the control system has instructions to transmit a second output signal to the flow control device to flow a gas path air from the stationary component through the conduit in a reverse direction opposite from the forward direction.

9. The system of claim 8, wherein the flow control device comprises at least one of a three-way valve, or a plurality of two-way valves, or a combination thereof.

10. The system of claim 8, comprising a temperature sensor configured to transmit a signal indicative of a temperature of the conduit or the stationary component to the control system.

11. The system of claim 8, wherein the control system has instructions to transition from transmitting the second output signal to transmitting the first output signal when at least one temperature of the conduit or the stationary component exceeds a temperature threshold, or duration of transmitting the second output signal exceeds a time threshold, or a combination thereof.

12. The system of claim 8, wherein the control system has instructions to operate the gas turbine engine at a normal speed that is greater than a startup speed when the compressed air flows through the conduit.

13. A method, comprising:
   flowing a gas path air from a stationary component of a turbine of a gas turbine engine through a conduit in a reverse direction when a flow control device is in a startup position; and
   heating a casing of the turbine using the flow of the gas path air through the conduit when the flow control device is in the startup position.

14. The method of claim 13, comprising flowing compressed air from a compressor of the gas turbine engine to the stationary component through the conduit in a forward direction opposite from the reverse direction when the flow control device is not in the startup position.

15. The method of claim 14, comprising switching from flowing the gas path air through the conduit to flowing compressed air through the conduit when at least one temperature of the conduit or the stationary component exceeds a temperature threshold, or duration of flowing the gas path air through the conduit exceeds a time threshold, or a combination thereof.

16. The method of claim 14, wherein a gas path temperature of the gas path air is greater than a compressed air temperature of the compressed air.

17. The method of claim 13, comprising conveying the gas path air from the conduit to an exhaust outlet of the turbine when the flow control device is in the startup position.

18. The method of claim 13, wherein flowing the gas path air through the conduit when the flow control device is in the startup position reduces a startup time of the gas turbine engine by at least approximately 50 percent.

19. The method of claim 13, wherein flowing the gas path air through the conduit when the flow control device is in the startup position reduces thermal gradients in the gas turbine engine, reduces interferences between components of the gas turbine engine, reduces rubbing of components of the gas turbine engine, or maintains clearances between components of the gas turbine engine, or a combination thereof.

20. The method of claim 13, comprising operating the gas turbine engine at a normal speed that is greater than a startup speed when flowing the compressed air through the conduit.

* * * * *